US008584988B1

(12) United States Patent  
Andrews

(10) Patent No.: US 8,584,988 B1  
(45) Date of Patent: Nov. 19, 2013

(54) MECHANICALLY FASTENED LARGE PRESSURIZED SPACECRAFT STRUCTURE

(75) Inventor: Thomas L. Andrews, Newport Beach, CA (US)

(73) Assignee: The Boeing Company, Chicago, IL (US)

( * ) Notice: Subject to any disclaimer, the term of this patent is extended or adjusted under 35 U.S.C. 154(b) by 411 days.

(21) Appl. No.: 12/888,266

(22) Filed: Sep. 22, 2010

(51) Int. Cl.  
*B64G 1/00* (2006.01)

(52) U.S. Cl.  
USPC ..................................... 244/158.1; 244/173.1

(58) Field of Classification Search  
USPC .......... 244/158.1, 171.7, 173.1; 277/630, 637  
See application file for complete search history.

(56) References Cited

U.S. PATENT DOCUMENTS

| 3,061,320 | A | * | 10/1962 | Haensch | 277/384 |
| 3,061,321 | A | * | 10/1962 | Smith | 277/637 |
| 3,231,289 | A | * | 1/1966 | Carrell | 277/632 |
| 4,828,207 | A | * | 5/1989 | Haynes | 244/171.7 |
| 6,669,205 | B2 | * | 12/2003 | Schenk | 277/628 |
| 6,793,183 | B1 | * | 9/2004 | Hand et al. | 244/158.1 |
| 2006/0145016 | A1 | * | 7/2006 | Renfro | 244/158.1 |
| 2009/0108137 | A1 | * | 4/2009 | Simon et al. | 244/171.3 |

* cited by examiner

*Primary Examiner* — Timothy D Collins  
*Assistant Examiner* — Jamie S Stehle  
(74) *Attorney, Agent, or Firm* — Yee & Associates, P.C.

(57) ABSTRACT

A first part, a second part, and a seal ring are fastened together to form a pressure structure configured for a spacecraft structure of a spacecraft, wherein the first part and the second part are each formed from a single workpiece.

8 Claims, 9 Drawing Sheets

MECHANICALLY FASTENED LARGE PRESSURIZED SPACECRAFT STRUCTURE

BACKGROUND INFORMATION

1. Field

The present disclosure relates generally to manufacturing and in particular to manufacturing pressure structures for a spacecraft, wherein the pressure structure may be assembled using only mechanical fasteners and may be pressurized for operation within an atmosphere of a planet and outside the atmosphere of the planet.

2. Background

Spacecraft are designed to maintain human life outside the atmosphere of the earth. Maintaining human life outside the atmosphere of the earth requires a pressure structure to provide a pressurized compartment within the spacecraft in which a crew may survive. Examples of such spacecraft having a pressure structure are United States spacecraft such as the Mercury capsule, the Gemini capsule, the Apollo capsule, and the Space Shuttle. Additional examples of such spacecraft are Russian spacecraft such as the Soyuz capsule.

In addition to pressure structures to provide pressurized compartments for a crew, pressure structures are also needed for cargo. Examples of spacecraft using a pressure structure for cargo carried into space are cargo transportation vehicles, such as the Automated Transfer Vehicle (ATV), and the H-II Transfer Vehicle (HTV). Other examples of spacecraft using a pressure structure for cargo carried into space are space shuttle cargo containers such as the Mini Payload Logistic Module (MPLM). In addition, space stations such as the International Space Station (ISS) may have elements such as modules, laboratories, and mating adapters that require pressure structures that can provide pressurized volumes within the spacecraft.

To date, pressure structures for spacecraft, including the foregoing examples, have been constructed by forming a number of panels, a number of frames, and a number of rings. The number of panels, the number of frames, and the number of rings are welded together to form an enclosed volume that may be pressurized. Welding together a number of panels, frames, and rings to form a pressure structure that can be pressurized to provide a pressurized volume within a spacecraft requires a number of special development tools, impacts development and construction schedules, and increases demands for testing.

Therefore, it would be desirable to have a method and apparatus that may overcome one or more of the issues described above, as well as other possible issues.

SUMMARY

In one advantageous embodiment, a first part, a second part, and a seal ring are fastened together to form a pressure structure configured for a spacecraft structure of a spacecraft, wherein the first part and the second part are each formed from a single workpiece.

In another advantageous embodiment, a configuration is identified for a plurality of parts to form a pressure structure with an enclosed volume for a spacecraft. The plurality of parts have a plurality of flanges extending from the plurality of parts configured to be joined by a plurality of fasteners. The plurality of parts are manufactured in accordance with the configuration. The plurality of parts are joined by a plurality of fasteners to form a volume within the pressure structure for a spacecraft.

In yet another advantageous embodiment, a first part and a second part are joined to form an enclosed volume for a spacecraft by pressing a first flange extending beyond a first rim of the first part and a second flange extending beyond a second rim of the second part together with a seal ring and a number of sealing elements sandwiched between the first flange and the second flange. A plurality of fasteners are passed through a plurality of through holes in the seal ring and a plurality of openings in the first flange and in the second flange. The plurality of fasteners are tightened to form a seal between the first part and the second part and configured for maintaining a pressure in a volume within the pressure structure in an atmosphere of a planet and outside an atmosphere of the planet.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

DETAILED DESCRIPTION

Figure 1:
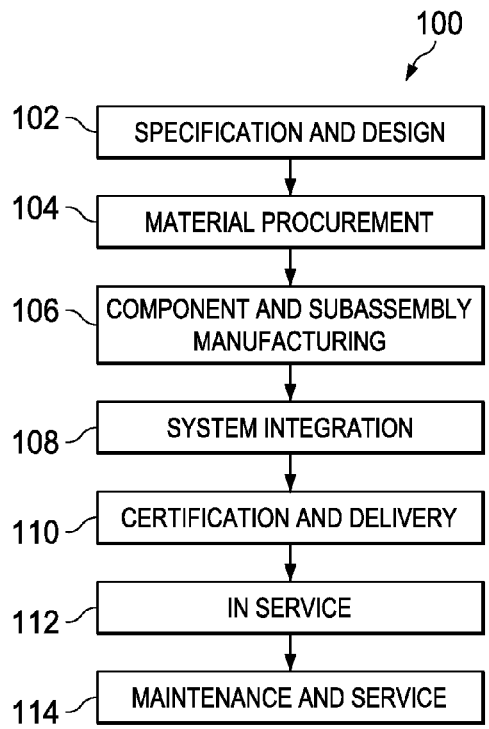
FIG. 1 is an illustration of a spacecraft manufacturing and service method depicted in accordance with an advantageous embodiment.
Figure 2:
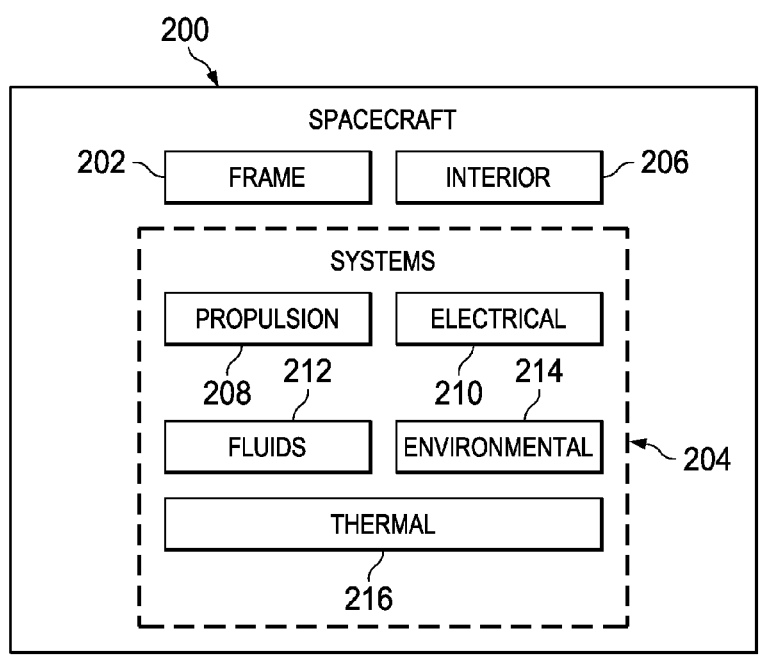
FIG. 2 is an illustration of a spacecraft in which an advantageous embodiment may be implemented.

Referring more particularly to the drawings, embodiments of the disclosure may be described in the context of spacecraft manufacturing and service method 100 as shown in FIG. 1 and spacecraft 200 as shown in FIG. 2. Turning first to FIG. 1, an illustration of a spacecraft manufacturing and service method is depicted in accordance with an advantageous embodiment. During pre-production, spacecraft manufacturing and service method 100 may include specification and design 102 of spacecraft 200 in FIG. 2 and material procurement 104.

During production, component and subassembly manufacturing 106 and system integration 108 of spacecraft 200 in FIG. 2 takes place. Thereafter, spacecraft 200 in FIG. 2 may go through certification and delivery 110 in order to be placed in service 112. While in service 112 by a customer, spacecraft 200 in FIG. 2 is scheduled for routine maintenance and service 114, which may include modification, reconfiguration, refurbishment, and other maintenance or service.

Each of the processes of spacecraft manufacturing and service method 100 may be performed or carried out by a system integrator, a third party, and/or an operator. In these examples, the operator may be a customer. For the purposes of this description, a system integrator may include, without limitation, any number of spacecraft manufacturers and major-system subcontractors. A third party may include, without limitation, any number of venders, subcontractors, and suppliers. An operator may be an airline, leasing company, military entity, service organization, and so on.

With reference now to FIG. 2, an illustration of a spacecraft is depicted in which an advantageous embodiment may be implemented. In this example, spacecraft 200 is produced by spacecraft manufacturing and service method 100 in FIG. 1 and may include frame 202 with a plurality of systems 204 and interior 206. Examples of systems 204 include one or more of propulsion system 208, electrical system 210, fluids system 212, environmental system 214, and thermal protection system 216. Any number of other systems may be included. Although a spacecraft example is shown, different advantageous embodiments may be applied to other industries, such as the automotive industry, the heavy equipment industry, the petrochemical industry, or the marine industry.

Apparatus and methods embodied herein may be employed during at least one of the stages of spacecraft manufacturing and service method 100 in FIG. 1. As used herein, the phrase "at least one of", when used with a list of items, means that different combinations of one or more of the listed items may be used and only one of each item in the list may be needed. For example, "at least one of item A, item B, and item C" may include, for example, without limitation, item A or item A and item B. This example also may include item A, item B, and item C or item B and item C.

In one illustrative example, components or subassemblies produced in component and subassembly manufacturing 106 in FIG. 1 may be fabricated or manufactured in a manner similar to components or subassemblies produced while spacecraft 200 in FIG. 2 is in service 112 in FIG. 1. As yet another example, a number of apparatus embodiments, method embodiments, or a combination thereof may be utilized during production stages, such as component and subassembly manufacturing 106 and system integration 108 in FIG. 1.

A number, when referring to items, means one or more items. For example, a number of apparatus embodiments may be one or more apparatus embodiments. A number of apparatus embodiments, method embodiments, or a combination thereof may be utilized while spacecraft 200 in FIG. 2 is in service 112 and/or during maintenance and service 114 in FIG. 1. The use of a number of the different advantageous embodiments may substantially expedite the assembly of and/or reduce the cost of spacecraft 200 in FIG. 2.

As used herein, a number means one or more. As used herein, a spacecraft structure means a portion of a spacecraft that incorporates a pressure structure to provide a pressurized volume and that integrates the pressure structure into a spacecraft. As used herein, a spacecraft is any vehicle capable of leaving the atmosphere of the earth and may be configured for one or more purpose to carry out a mission outside of the atmosphere of the earth and may include travel to and from a number of other planets, moons, asteroids, satellites, space station, spacecraft, or other objects outside of the atmosphere of the earth.

The different advantageous embodiments recognize and take into account a number of different considerations. For example, the different advantageous embodiments recognize and take into account that a pressure structure for a spacecraft that is formed using welding may cost significantly more to manufacture than a pressure structure that is formed without welding. For example, a cost associated with welding the pressure structure may require development of special welding fixtures and custom built welding machines to meet the unique requirements of pressure structures for spacecraft.

Requirements of pressure structures for spacecraft are unique because the pressure structure may operate both inside and outside an atmosphere of a planet. The planet may be the Earth, or it may another planet to which the spacecraft may travel. Such unique requirements demand exacting inspection methods to validate integrity of each weld. Inspection systems using radiographic or ultrasonic devices and chambers resistant to radiation may be required when welding is used in the construction of the pressure structure.

In addition, part to part alignment in a welded pressure structure may require tooling of greater complexity than for a structure formed without welding. In addition, fit up may also require tooling of greater complexity. For example, as a weld solidifies, shrinkage of the weld may occur, impeding integration of the pressure structure. Integration of the pressure structure involves additional structural elements that need to be affixed both outside and inside of the pressure structure to integrate the pressure structure into a spacecraft structure. Moreover, tooling of greater complexity may be required to resist distortion of the pressure structure due to stresses placed on the material of the pressure structure by the heat of the welding process. A thermal sink may be required to prevent the parts of the pressure structure from overheating during the welding process.

After the pressure structure is welded together, another problem may arise in managing a timeline for assembly of the spacecraft. Only a limited number of technicians may work in a volume comprising an inside of a pressure structure at one time because they must work within an enclosed volume. For example, in constructing the Apollo capsule, a volume comprising an inside of the pressure structure of the capsule limited access and controlled the critical path schedule for assembly of the space capsule.

The advantageous embodiments recognize and take into account that a pressure structure of a spacecraft that can be formed without using a welding process is desirable. Such a process may allow formation of a pressure structure for a pressurized volume within a spacecraft structure using only mechanical fasteners.

The advantageous embodiments recognize and take into account that an apparatus may be manufactured and assembled to form a pressure structure of a spacecraft. The apparatus may be a pressure structure. The pressure structure may be assembled out of two halves without welding. The pressure structure may comprise a first part and a second part arranged to form a volume enclosed by the first part and the second part. The apparatus may be integrated into a spacecraft to form a spacecraft structure. A first flange may extend beyond a first rim of the first part and a second flange may extend beyond a second rim of the second part. A plurality of fasteners may be configured to press the first flange and the second flange together with a seal ring positioned between a first surface of the first flange and a second surface of the second flange.

Figure 3:
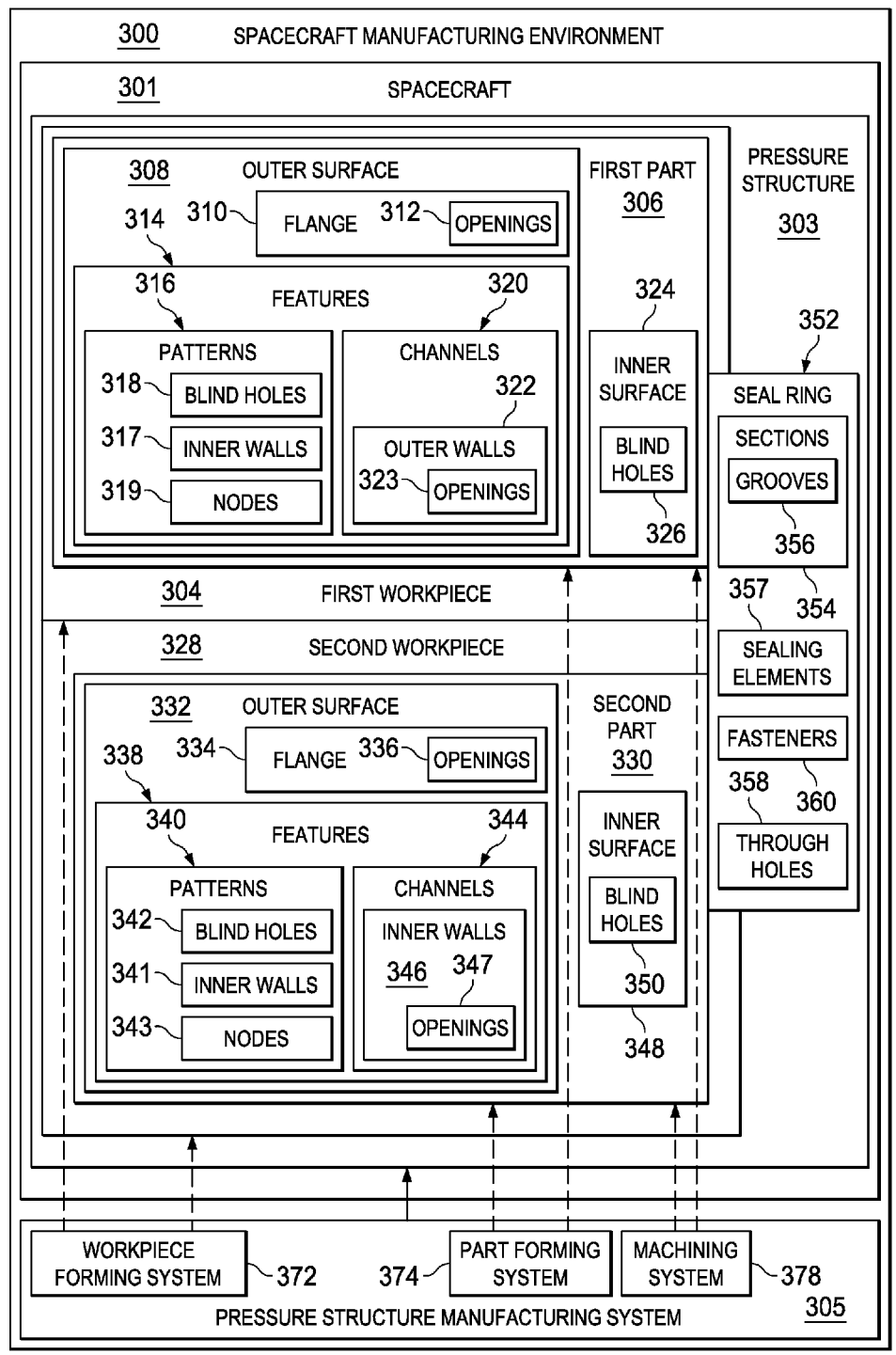
FIG. 3 is an illustration of a spacecraft manufacturing environment depicted in accordance with an advantageous embodiment.

Turning to FIG. 3, an illustration of a spacecraft manufacturing environment is depicted in accordance with an advantageous embodiment. Spacecraft manufacturing environment 300 may be an environment in which spacecraft 301 may be manufactured and assembled. As used herein, the term spacecraft means a module, a capsule, a part, or an entire spacecraft. Spacecraft 301 may include a reentry vehicle. A reentry vehicle is a spacecraft that is designed to be launched into space and to return to Earth. Alternatively, spacecraft 301 may be an orbiting space station, or an interplanetary spacecraft that is not designed to return to Earth. Spacecraft 301 may be spacecraft 200 in FIG. 2.

Spacecraft 301 may comprise pressure structure 303. Pressure structure 303 may be any enclosed volume on spacecraft 301 that may be pressurized. For example, pressure structure 303 may be a pressurized compartment for a crew. Pressure structure 303 may be a pressurized compartment for a cargo on spacecraft 301. Pressure structure 303 may include a number of elements for use on a space station or other spacecraft such as spacecraft 301. Examples of the number of elements may be habitation modules, laboratory modules, observatory modules, and communication modules. In addition, mating adapters between modules may be required. Each of the number of elements may require one or more pressurized volumes in a pressure structure.

Pressure structure 303 may include first part 306 and second part 330. First part 306 and second part 330 may be joined together to form pressure structure 303 using seal ring 352. Seal ring 352 may be positioned between first part 306 and second part 330 to form a seal when first part 306 and second part 330 are joined together to form pressure structure 303. In accordance with an advantageous embodiment, first part 306 may be formed from first workpiece 304. Similarly, second part 330 may be formed from second workpiece 328.

Spacecraft manufacturing environment 300 comprises pressure structure manufacturing system 305. Pressure structure manufacturing system 305 may include workpiece forming system 372, part forming system 374, and machining system 378.

First workpiece 304 and second workpiece 328 may be formed by workpiece forming system 372. Workpiece forming system 372 may include a rolling process, a cutting process, and a heating process for forming each of first workpiece 304 and second workpiece 328 from a plate of metal. For example, a plate of metal may be rolled into a desired thickness. Next, the rolled plate may be cut in a size and a configuration to form first workpiece 304. Likewise, in response to rolling another plate of metal into a desired thickness, workpiece forming system 372 may cut the rolled plate into a desired configuration to create second workpiece 328.

The advantageous embodiments recognize and take into account that the plates from which first workpiece 304 and second workpiece 328 may be formed by workpiece forming system 372 may be aluminum. In an advantageous embodiment, the plates may be aluminum alloy plates greater than 2.4 inches thick.

In an advantageous embodiment, first workpiece 304 may be a circular plate having a hole in the center for mounting on a machine in part forming system 374. First part 306 may be formed from first workpiece 304 by part forming system 374 on a machine configured for spinning and forming. A process of spinning and forming may be known as spin forming. Spin forming may be a process in which a workpiece, such as first workpiece 304, may be mounted on an axial support, heated, and rotated about an axis. While the heated first workpiece 304 rotates, a roller may be pressed against a surface of first workpiece 304 to form first workpiece 304 into a first shape. As used herein, shape means a configuration having a complex curvature.

In an advantageous embodiment, the first shape may be a dome. In another advantageous embodiment, the first shape may be a cone. In another advantageous embodiment, the first shape may be a cylinder. The advantageous embodiments recognize and take into account that the shape into which first workpiece 304 is formed to form first part 306 may be determined by a desired spacecraft structure design and a number of operational specifications.

Likewise, second part 330 may be formed from second workpiece 328 by a spin forming process implemented in part forming system 374. In this case, second workpiece 328 is mounted on the axial support, heated, and rotated about the axis while the roller is pressed against a surface of second workpiece 328 to form second workpiece 328 into a second shape.

In an advantageous embodiment, the second shape may be a dome. In another advantageous embodiment, the second shape may be a cone. In another advantageous embodiment, the second shape may be a cylinder. The advantageous embodiments recognize and take into account that the shape into which second workpiece 328 is formed to form second part 330 may be determined by the desired spacecraft design and a number of operational specifications.

The advantageous embodiments recognize and take into account that a shape of a first part 306 or a second part 330 may be referred to by a number of terms, including, without limitation, a bulkhead, a dome, a cone, or a cylinder.

After forming first workpiece 304 and second workpiece 328 into the desired shapes for first part 306 and second part 330, respectively, part forming system 374 may heat and then quench the formed shapes to increase one or more desired mechanical properties. In an advantageous embodiment, part forming system 374 may etch the formed shapes with chemicals for penetrant inspection. Part forming system 374 may chemically or electrochemically treat the formed shapes for corrosion resistance. The formed shapes may be further processed by machining system to form first part 306 and second part 330.

First part 306 comprises outer surface 308 and inner surface 324. Outer surface 308 comprises flange 310 and features 314. Flange 310 comprises a number of openings 312. Features 314 comprise a number of patterns 316 and a number of channels 320. Patterns 316 further comprise inner walls 317, blind holes 318, and nodes 319. Channels 320 comprise a number of outer walls 322. Outer walls 322 form a boundary between patterns 316 and channels 320. Outer walls 322 may have openings 323 for receiving fasteners to affix additional structures to outer surface 308 of first part 306. Inner surface 324 comprises a number of blind holes 326.

The advantageous embodiments recognize and take into account that features 314 may provide strength to first part 306 by providing a pattern of inner walls intersecting at a plurality of nodes to provide strength to first part 306. Outer walls 322 may also provide strength to first part 306.

Similarly, second part 330 comprises outer surface 332 and inner surface 348. Outer surface 332 comprises flange 334 and features 338. Flange 334 comprises a number of openings 336. Features 338 comprise a number of patterns 340 and a number of channels 344. Patterns 340 further comprise inner walls 341, blind holes 342, and nodes 343. Channels 344 comprise a number of outer walls 346. Outer walls 346 form a boundary between patterns 340 and channels 344. Outer walls 346 may have openings 347 for receiving fasteners to affix additional structures to outer surface 332 of second part 330. Inner surface 348 comprises a number of blind holes 350.

The advantageous embodiments recognize and take into account that features 338 may provide strength to second part 330 by providing a pattern of inner walls intersecting at a plurality of nodes to provide strength to second part 330. Outer walls 346 may also provide strength to second part 330.

The advantageous embodiments recognize and take into account that spaces between inner walls 317 and outer walls 322 of first part 306, and inner walls 341 and outer walls 346 of second part 330, respectively, may be formed by part forming system 374 of pressure structure manufacturing system 305. Part forming system 374 may comprise machining that removes material from first workpiece 304 or second workpiece 328 to form the spaces between inner walls 317 and outer walls 322 of first part 306, and inner walls 341 and outer walls 346 of second part 330, respectively.

Alternatively, part forming system 374 may employ a chemical milling process in order to remove a quantity of material from first workpiece 304 or second workpiece 328 to form the spaces between inner walls 317 and outer walls 322 of first part 306, and inner walls 341 and outer walls 346 of second part 330. In addition, part forming system 374 may remove the material between patterns 316 to form a number of channels 320. In an advantageous embodiment, machining system 378 may employ high speed multi-axis gantry mills to generate flanges 310 and 334, and features 314 and 338.

The advantageous embodiments recognize and take into account that such high speed multi-axis machines may be controlled by one or more processors in a computing system and that such computing systems for controlling high speed multi-axis machines are known to persons skilled in the art. The advantageous embodiments recognize and take into account that high speed multi-axis machines, such as those that may be employed by part forming system 374, cut features, such as patterns and channels discussed herein, into a wide variety of shapes formed from plates such as the workpieces discussed herein. The advantageous embodiments recognize and take into account that part forming system 374 is enabled using high speed multi-axis machines controlled by one or more processors in a computing system to cut features into a large complex curvature of a shape, such as a dome, or a shape with a spherical radius, while achieving accurate tolerances as required for a pressure structure of a spacecraft.

In an advantageous embodiment, patterns 316 of features 314 and patterns 340 of features 338 may be referred to as an isogrid, a grid structure, a waffle grid, or an integrally machined structure. Patterns 316 and patterns 340 may be formed over a substantial portion of outer surface 308 of first part 306 and over a substantial portion of outer surface 332 of second part 330. Pattern 316 and 340 provide general structural stability. The remaining material from first part 306 and second part 330 may have a minimum thickness of about 0.080 inch thick for pressure containment.

The advantageous embodiments recognize and take into account that removed material may reduce overall structural mass. In an advantageous embodiment, approximately ten percent of the mass of first part 306 and second part 330 remains after machining system 378 forms flanges 310 and 334 and features 314 and 338.

The advantageous embodiments recognize and take into account that a ratio between a thickness of flanges 310 and 334 of first part 306 and second part 330 may be determined by a potential out of round condition of first part 306 and second part 330 following processing by part forming system 374. Such out of round condition may be corrected by machining system 378.

The advantageous embodiments recognize and take into account that first part 306 and second part 330 may distort slightly during operations of part forming system 374. For example, first part 306 and second part 330 may be distorted during spinning and heat treatment operations. However, first part 306 and second part 330 may be straightened to a near round condition by machining system 378.

The advantageous embodiments recognize and take into account that an round condition may require removal of additional material of first part 306 or second part 330 by machining system 378.

Part forming system 374 also may be used to drill a number of blind holes 318 and 342 in a number of nodes 319 and 343 by drilling from outer surface 308 or 332. In an advantageous embodiment, blind holes 318 and 342 may be drilled and threaded to form a female portion of a connection. Thus, blind holes 318 and 342 may be configured to receive a male portion of a connection for a variety of items to be affixed to outer surface 308 of first part 306 or to outer surface 332 of second part 330 to integrate pressure structure 303 into spacecraft 301 by forming a spacecraft structure.

The advantageous embodiments recognize and take into account that the variety of items to be affixed to outer surfaces 308 and 332 may comprise cables, tubing, and secondary structural features running between pressure structure 303 and an outer layer of spacecraft 301. The variety of items may comprise connections to an outer layer of spacecraft 301.

Part forming system 374 may remove or preserve the material forming inner surface 324 of first part 306 and inner surface 348 of second part 330 to form a substantially smooth surface. Part forming system 374 may drill and thread a number of blind holes 326 or 350 into a rear face of the nodes extending outward from outer surfaces 308 or 332 by drilling from inner surfaces 324 or 348, respectively. Part forming system 374 may employ a computer controlled machine tool to determine a location of blind holes 326 and 350 so that each blind hole is drilled into substantially a center portion of the node.

In an advantageous embodiment, blind holes 326 and 350 may be threaded to form a female portion of a connection. Thus, blind holes 326 and 350 may be configured to receive a male portion of a connection for a variety of items to be affixed to inner surface 324 of first part 306 or to inner surface 348 of second part 330 to integrate pressure structure 303 into spacecraft 301 by forming a spacecraft structure.

The advantageous embodiments recognize and take into account that the variety of items to be affixed to inner surfaces 324 or 348 may comprise instrumentation, environmental controls, and crew seating and crew support systems. Examples of crew support systems that may be affixed to inner surface 324 or inner surface 348 may include life support systems, communication systems, instrumentation, and other systems necessary to a configuration for a particular mission of the spacecraft.

The advantageous embodiments recognize and take into account that blind holes 326 and 350 may not be drilled into nodes into which blind holes 318 and 342 have been drilled.

Likewise, the advantageous embodiments recognize and take into account that blind holes 318 and 342 may not be drilled into a node to which blind holes 326 and 350 have been drilled. Thus, a blind hole may be drilled into a node of first part 306 or second part 330 from either outer surface 308 or 332 or inner surface 324 or 348, but only one blind hole may be drilled per node in order to ensure integrity of pressure structure 303.

As used herein, the term blind hole shall mean a hole configured for threaded engagement, the hole extending in a thickness of a material forming a first part or a second part to a depth that may be in an approximate range from approximately twenty five percent of the thickness of the first part to seventy five percent of the thickness of the first part. Blind holes are used for affixing structural elements to both inner surface 324 and outer surface 308 of first part 306, and for affixing structural elements to both inner surface 348 and outer surface 332 of second part 330.

In an advantageous embodiment, blind holes in either outer surface 308 of first part 306 or outer surface 332 of second part 330 are operably positioned in nodes of patterns 316 and patterns 340 because the nodes may be a relatively thick portion of first part 306 or second part 330. The advantageous embodiments recognize and take into account that a blind hole may leave sufficient material between outer surface 308 and inner surface 324 of first part 306 and outer surface 332 and inner surface 348 of second part 330 to maintain integrity of a volume in pressure structure 303 within spacecraft 301.

In an advantageous embodiment, blind holes 318, 326, 342, and 350 may be standardized in size and thread configuration to facilitate design of fixtures to be incorporated into the pressure structure.

In an advantageous embodiment, a number of blind holes 318, 326, 342, and 350 may be drilled to further reduce a weight of the pressure structure. In the event blind holes 318, 326, 342, and 350 are drilled to reduce weight and not to receive a fixture, the blind holes may not be threaded or otherwise configured for receiving a fixture. In an advantageous embodiment, each node in the patterns of the pressure structure may have a blind hole.

Seal ring 352 is configured for insertion between first part 306 and second part 330. Seal ring 352 may have approximately a same outer diameter as flange 310 of first part 306 and as flange 334 of second part 330. Seal ring 352 may comprise a number of sections 354.

The advantageous embodiments recognize and take into account that a seal ring with a sufficient diameter for a pressure structure of a spacecraft may bend when being lifted or carried during assembly. Moreover, a size of a seal ring for the pressure structure of the spacecraft may be difficult to ship from a manufacturer to an assembly plant.

The advantageous embodiments recognize and take into account that a seal ring may be formed from sections. Each section may interlock with a locking mechanism, such as a dovetail interlock.

The advantageous embodiments recognize that sections 354 of seal ring 352 may be wider on an inner side to allow for additional thickness of a portion of the locking mechanism or the dovetail interlock.

Sections 354 may be assembled by placing each of sections 354 onto flange 334 of second part 330 by placing a first section onto flange 334 and then interlocking a next section and so forth until a complete seal ring is positioned on top of flange 334 of second part 330.

Seal ring 352, whether formed in sections or in a single piece, may comprise a number of grooves 356. Grooves 356 are configured to receive a number of sealing elements 357.

The advantageous embodiments recognize and take into account that two sealing elements are preferable to one sealing element because the use of two sealing elements provides a redundant sealing capability. Seal ring 352 may have two concentric grooves forming two concentric circular grooves 356 in a top surface of seal ring 352. Similarly, seal ring 352 may have two concentric grooves forming two concentric circular grooves 356 in a bottom surface of seal ring 352. Grooves 356 are configured to receive sealing elements 357.

The advantageous embodiments recognize and take into account that a gas groove may be configured between a first groove and a second groove on each side of seal ring 352. The gas groove may not extend the full length of a section of seal ring 352, but may be ported so that integrity of sealing elements 357 may be tested by an introduction of a gas, such as helium, into each gas groove.

The advantageous embodiments recognize and take into account that, when first part 306 is affixed to second part 330 with seal ring 352 between in order to provide a pressurized volume in pressure structure 303, an introduction of gas into a gas groove may be used to determine whether any sealing element 357 may have a leak. A leak may be detected, and the location of the leak may be determined, by mass spectrometer testing or some other suitable form of gas detection.

Seal ring 352 may be affixed to first part 306 and second part 330 by fasteners 360. Fasteners 360 are configured to be inserted into openings 312 in flange 310, into through holes 358 in seal ring 352, and into openings 336 in flange 334 of second part 330. Fasteners 360 may be configured for tightening to press flange 310 and flange 334 against seal ring 352 so that sealing elements 357 provide a pressure seal for pressure structure 303.

Sealing elements 357 may comprise vulcanized silicone and may be formed in dual seal traces configured to be sandwiched between first part 306 and second part 330. Fasteners 360 for joining first part 306 and second part 330 may be bolts and nuts. Seal ring 352 may be a girth seal. In an advantageous embodiment, seal ring 352 may comprise sealing elements 357 of an elastomeric compound. For example, sealing elements 357 may be formed of Teflon or a polytetrafluoroethylene (PTFE) compound. In an advantageous embodiment, seal ring 352 may comprise sealing elements 357 made from a metal.

The advantageous embodiments recognize and take into account that a pressure structure for an spacecraft that is built in two parts and that may be joined by a mechanical fastening system and then taken apart by releasing the mechanical fastening system has a number of advantages.

The advantageous embodiments recognize and take into account that first part 306 and second part 330 are configured to be joined together with mechanical fasteners and seals. The advantageous embodiments recognize and take into account that by assembling first part 306 and second part 330 with fasteners 360, first part 306 and second part 330 may be temporarily assembled, tested, and then disassembled for final system installation.

An ability to temporarily assemble and disassemble a pressure structure, such as pressure structure 303, may allow finishing of the pressure structure to be processed in parallel operations. Processing may include operations to complete construction and integration of pressure structure 303 into spacecraft 301. First part 306 and second part 330 may then be reassembled for final processing before integration with spacecraft 301 for flight into space, and then disassembled upon return to earth for inspection, refurbishment, and reuse.

Furthermore, the enablement of parallel processing by the formation of pressure structure 303 from first part 306 and second part 330 may reduce an overall assembly and refurbishment span time as well as an assembly labor cost due to a greater efficiency in a technician's time. A greater efficiency of a technician's time may be due to improved access and ergonomics from working on first part 306 and second part 330 simultaneously in separate locations.

In addition, first part 306 and second part 330 are each machined to form a flange and a seal face. One or both of first part 306 and second part 330 may be machined to form a mechanical joint to attach another structure, such as a tunnel, to one of first part 306 or second part 330.

The advantageous embodiments recognize and take into account that testing may comprise pneumatic proof testing, cyclic pressure testing for fatigue assessment, localized helium leak testing, long term pressure decay testing, and applied structural load testing. Channels 320 of first part 306 and channels 344 of second part 330 are configured to receive a number of members.

The advantageous embodiments recognize and take into account that first part 306 and second part 330 may be joined by devices that are mechanical. The advantageous embodiments recognize and take into account that first part 306 and second part 330 may be joined using seals, such as seal ring 352, to form a pressurized volume without welding.

The advantageous embodiments recognize and take into account that first part 306 and second part 330, when joined, may form a pressurized volume for a crew of a spacecraft or for carrying a pressure-sensitive cargo into space. The advantageous embodiments recognize and take into account that joining first part 306 and second part 330 may be performed by mechanical means and without welding.

The illustration of FIG. 3 is not meant to imply physical or architectural limitations to the manner in which different advantageous embodiments may be implemented. Other components in addition and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

Figure 4:
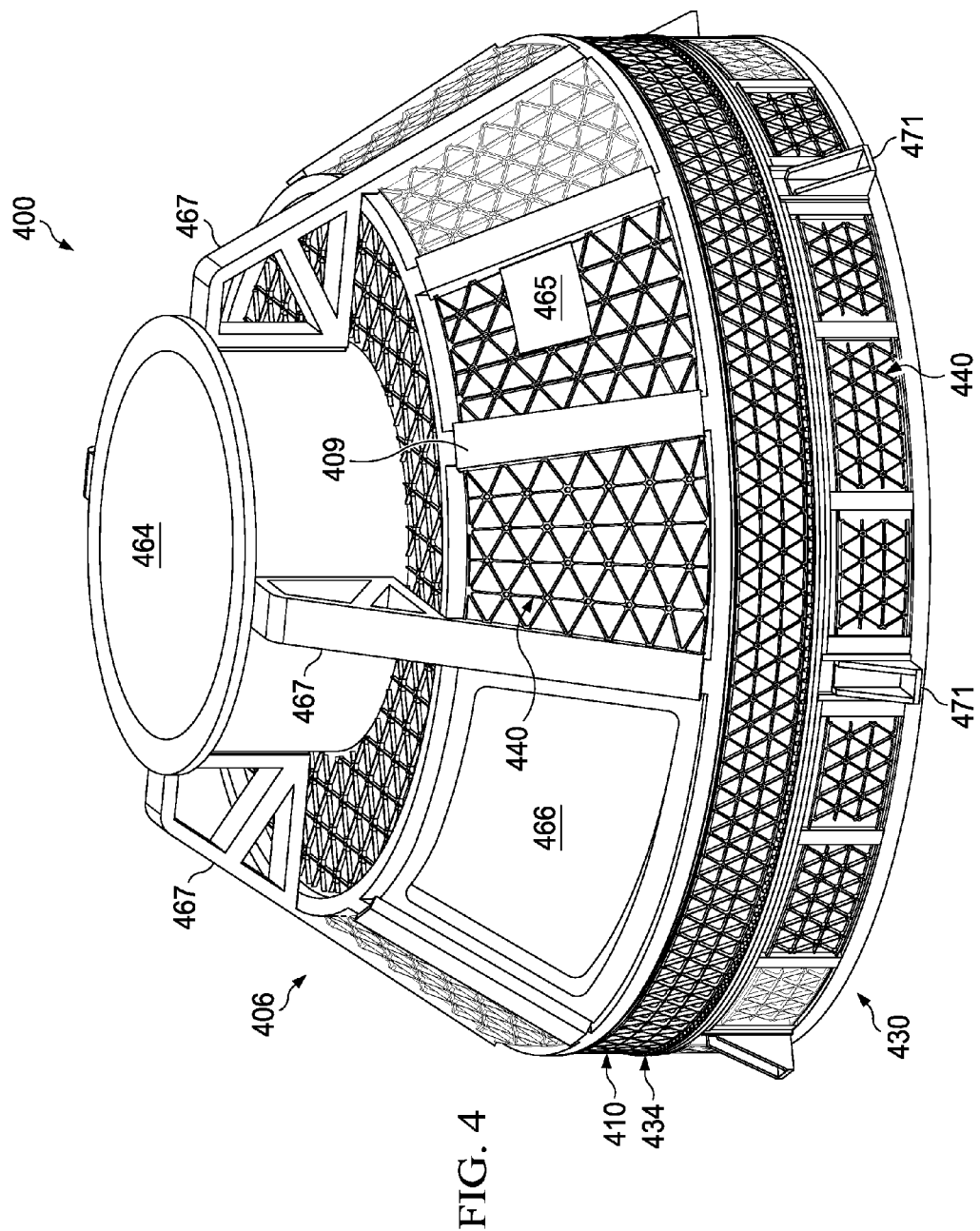
FIG. 4 is an illustration of a pressure structure for a spacecraft depicted in accordance with an advantageous embodiment.

Turning to FIG. 4, an illustration of a pressure structure for a spacecraft is depicted in accordance with an advantageous embodiment. Pressure structure 400 is depicted as assembled in FIG. 4 and will be discussed further in an exploded view in FIG. 5. In this example, pressure structure 400 is an example of pressure structure 303 that may be made in spacecraft manufacturing environment 300 in FIG. 3.

Pressure structure 400 may be a pressurized volume comprising first part 406 and second part 430 joined by first flange 410 and second flange 434. Pressure structure 400 has first members 409 and second members 467 affixed in channels of first part 406. Second part 430 has third members 471 affixed in channels of second part 430 (see FIG. 5 for channels). First part 406 has a number of patterns such as pattern 440. In addition, first part 406 has tunnel 464 engaged to a top portion of first part 406. First part 406 has hatch interface 466 configured to receive a hatch system (hatch system not shown). Pattern voids 465 are configured for further processing for windows or for cable or tubing to pass through by a number of sealed connections known to persons skilled in the art.

Figure 5:
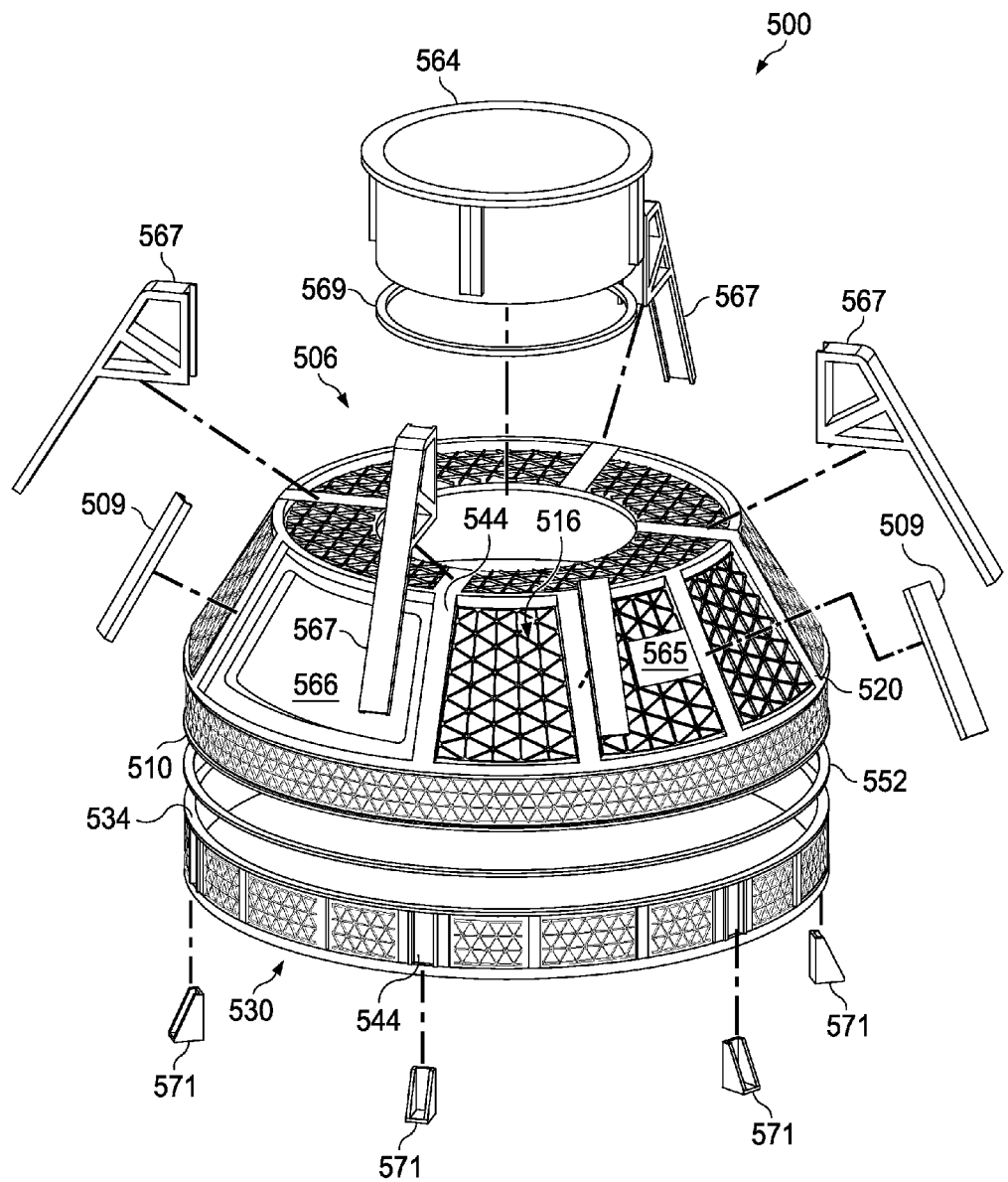
FIG. 5 is an illustration of an exploded view of the pressure structure for the spacecraft depicted in accordance with an advantageous embodiment.

Turning to FIG. 5, an illustration of an exploded view of the pressure structure for the spacecraft is depicted in accordance with an advantageous embodiment. Pressure structure 500 comprises first part 506 and second part 530. First part 506 is configured to receive first members 509 and second members 567 in channels 520. Second part 530 is configured to receive third members 571 in channels 544. First part 506 has patterns, such as patterns 516, and second part 530 has patterns, such as pattern 540. Seal ring 552 may be seen between first part 506 and second part 530. Seal ring 552 may be positioned between flange 510 of first part 506 and flange 534 of second part 530.

The advantageous embodiments recognize and take into account that members, such as first members 509, second members 567, and third members 571, are illustrative examples of members that may be affixed to pressure structure 500 and that a configuration of members affixed to pressure structure 500 varies for each application in a particular spacecraft. Likewise, hatch interface 566 is an illustrative example of an access opening that may be incorporated into pressure structure 500. A configuration of a hatch interface may vary for each application in a particular spacecraft structure of a spacecraft.

First part 506 and second part 530 may be joined by bringing flange 510 and flange 534 together with seal ring 552 positioned in between. Tunnel 564 may be joined to first part 506 by tunnel seal 569. First members 509, second members 567, and third members 571 are configured to cooperate in affixing an outer shell and other components to pressure structure 500 to complete spacecraft 301 in FIG. 3. Pattern voids 565 are configured for further processing for windows or for cable or tubing to pass through by a number of sealed connections known to persons skilled in the art.

Figure 6:
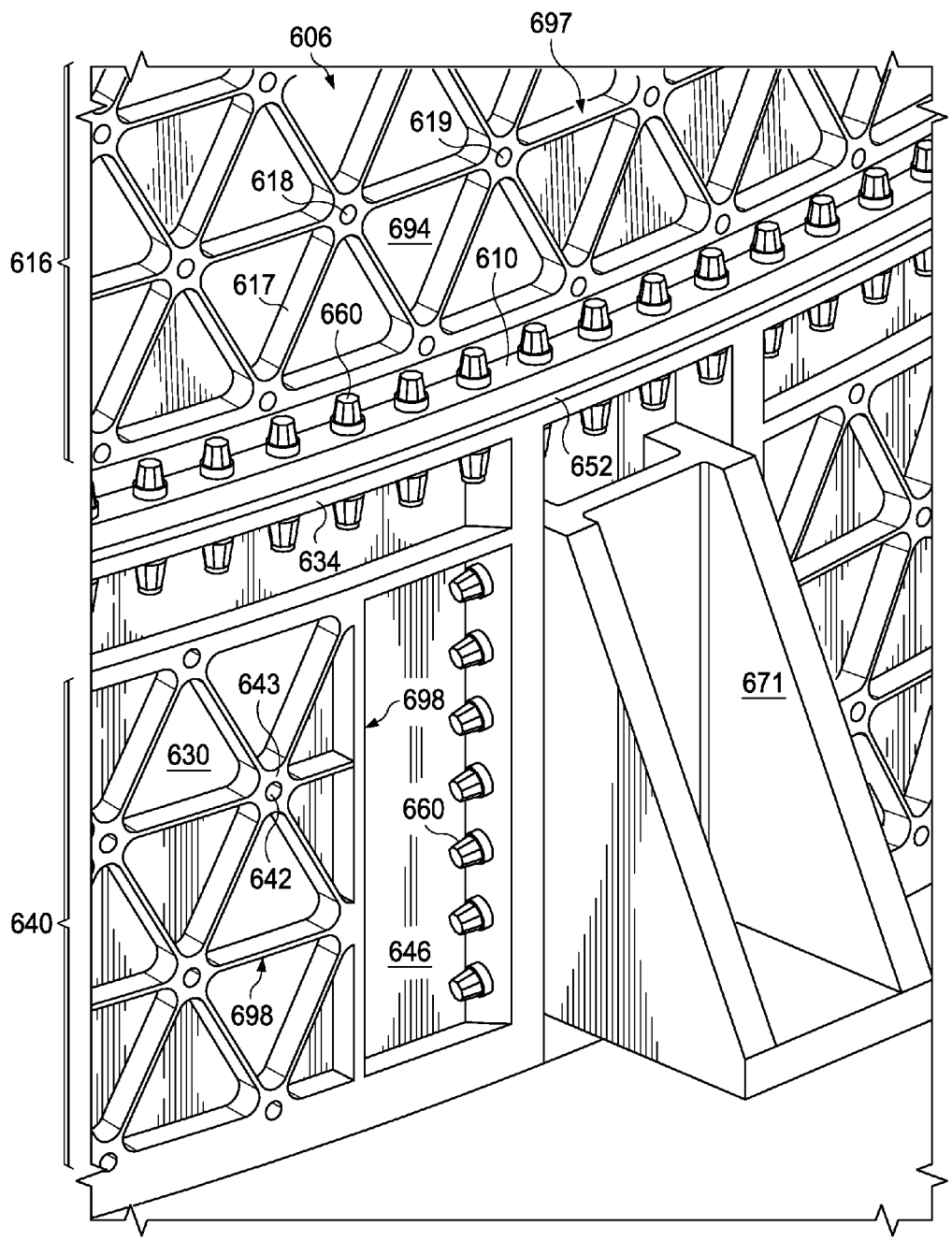
FIG. 6 is an illustration of a portion of the pressure structure depicted in accordance with an advantageous embodiment.

Turning to FIG. 6, an illustration of a portion of the pressure structure depicted in accordance with an advantageous embodiment. First part 606 and second part 630 are shown joined by first flange 610 and second flange 634. Seal ring 652 is shown between flange 610 of first part 606 and flange 634 of second part 630. A number of fasteners, such as fastener 660, secure first flange 610, seal ring 652, and second flange 634 together. Blind hole 618 may be in node 619 of pattern 697 in first part 606. Blind hole 642 may be in node 643 of pattern 698 on second part 630. Third member 671 may be affixed in a channel of second part 630 by a number of fasteners through outer wall 646 of pattern 698. Space 694 is representative of spaces between inner walls, such as inner wall 617, in pattern 616 of first part 606 and inner wall 641 of second part 630 that are created by machining system 378 of FIG. 3. Outer wall 646 is representative of outer walls 322 and 346 in FIG. 3.

In an advantageous embodiment, patterns 616 and 640 and channels 644 are of unitary construction with first part 606 and second part 630 because patterns, such as patterns 616 and 640, and channels, such channel 644, have been created by removal of material from first part 606 and second part 630 by machining system 378 of FIG. 3.

Figure 7:
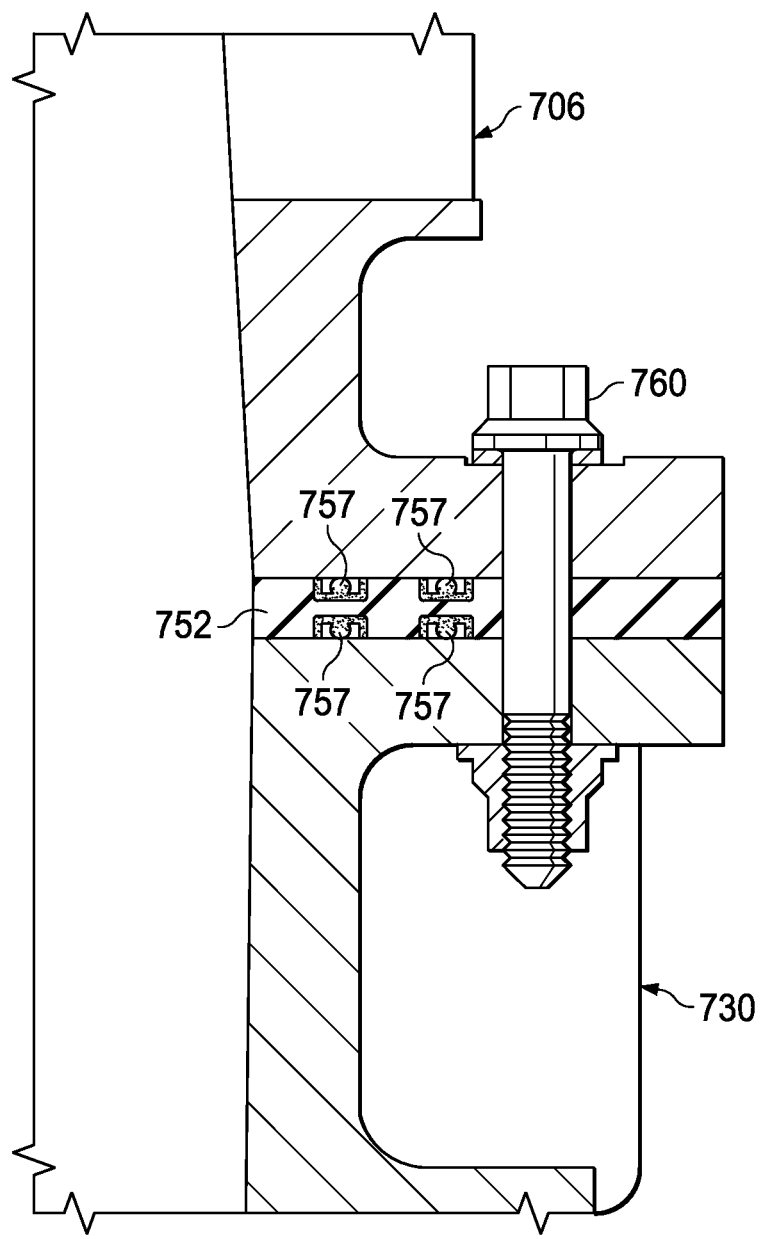
FIG. 7 is an illustration of a seal ring for joining parts of the pressure structure depicted in accordance with an advantageous embodiment.

Turning to FIG. 7, an illustration of sealing elements of the seal ring is depicted in accordance with an advantageous embodiment. Fastener 760 is representative of fasteners 360 in FIG. 3. Fastener 760 joins first part 706 to second part 730 with seal ring 752 sandwiched in between first part 706 and second part 730. Sealing elements 757 are examples of sealing elements 357 in FIG. 3. The advantageous embodiments recognize and take into account that fastener 760 may be a bolt and a nut that may be installed with a wrench. The advantageous embodiments further recognize and take into account that a bolt head, a nut, and a wrench installation clearance must be provided relative to a surrounding structure of pressure structure 303 in FIG. 3.

Figure 8:
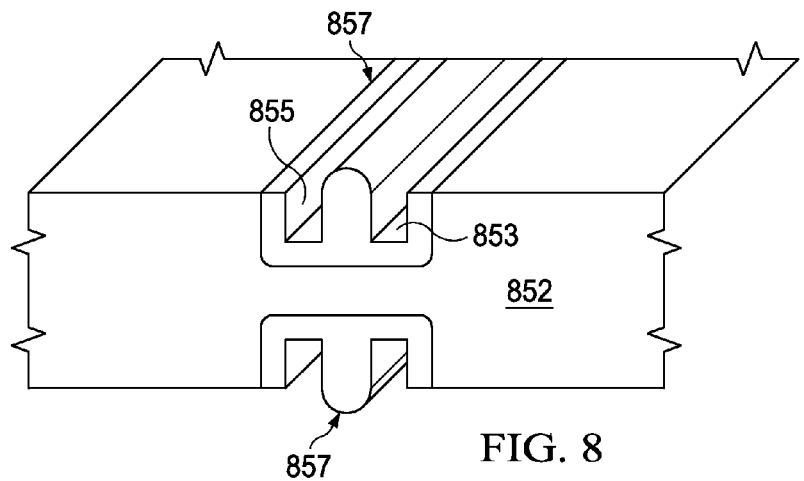
FIG. 8 is an illustration of a profile of a sealing element and seal ring depicted in accordance with an advantageous embodiment.

Turning to FIG. 8, an illustration of a profile of a sealing element and seal ring depicted in accordance with an advantageous embodiment. Sealing elements 857 may be sealing elements 357 in FIG. 3. Sealing elements 857 may have a profile 853 configured to fit with within grooves of seal ring 852. Profile 853 has channels 855 into which a portion of sealing elements 857 may move when compressed by flanges of first part and second part (see FIGS. 3, 4, and 5).

Figure 9:
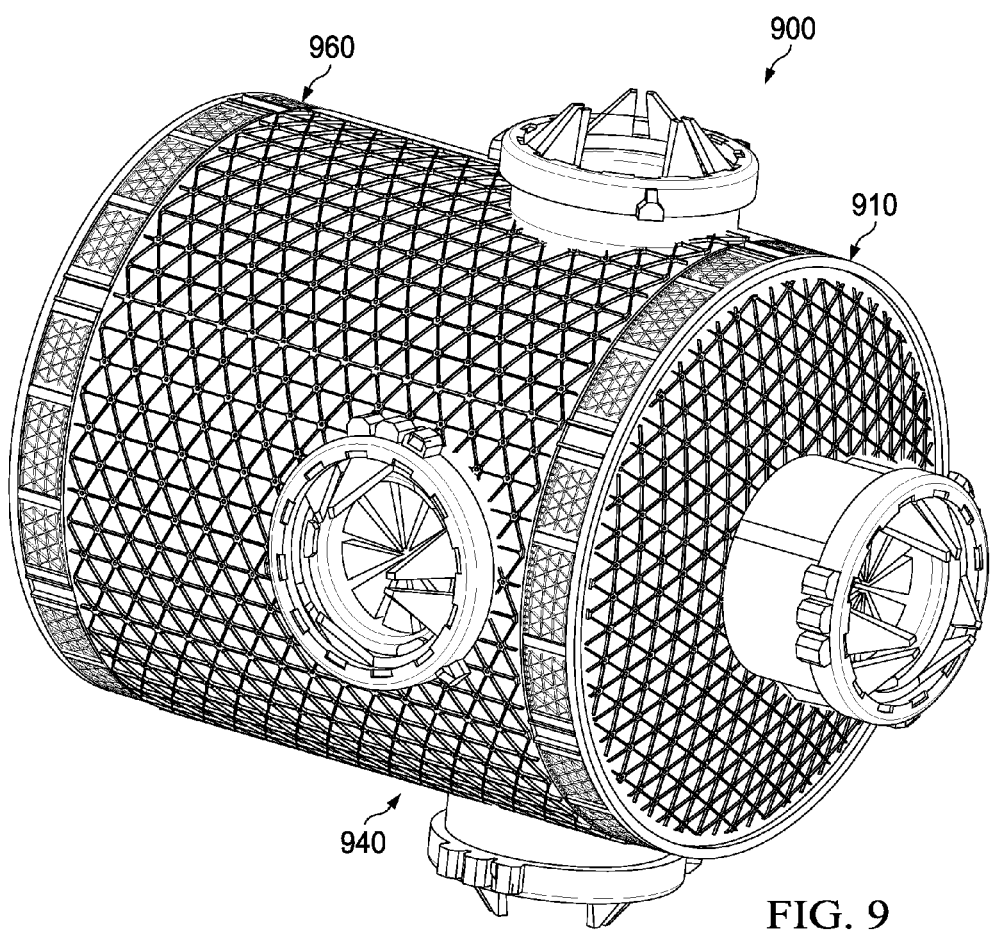
FIG. 9 is an illustration of an alternate embodiment of a pressure structure depicted in accordance with an advantageous embodiment.

Turning to FIG. 9, an illustration of an alternate embodiment of a pressure structure is depicted in accordance with an advantageous embodiment. In an alternate embodiment, one or more integrally machined forged cylinders, such as cylinder 940, are provided between a first part 910 and a second part 960 to form a space craft structure 900. First part 910, cylinder 940, and second part 960 may be connected with similar seal rings as seal ring 352 in FIG. 3, seal ring 752 in FIG. 7, and seal ring 852 in FIG. 8.

Figure 10:
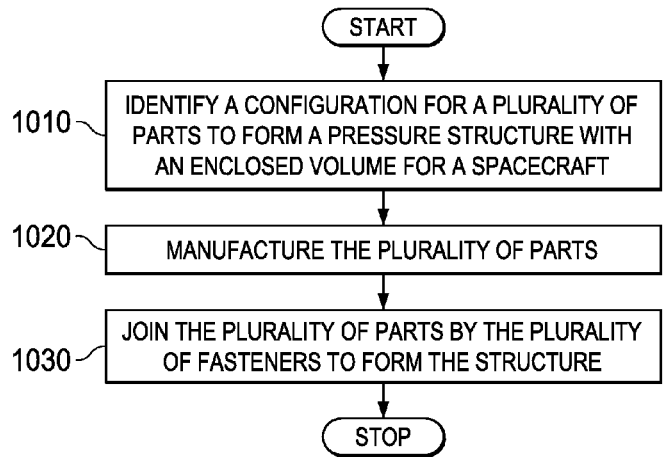
FIG. 10 is a flowchart of a method of manufacturing the interior structure depicted in accordance with an advantageous embodiment.

Turning to FIG. 10, a flowchart of a method of manufacturing the interior structure is depicted in accordance with an advantageous embodiment. The process starts and identifies a configuration for a plurality of parts to form a pressure structure with an enclosed volume for a spacecraft, wherein the plurality of parts have a plurality of flanges extending from the plurality of parts configured to be joined by a plurality of fasteners (operation 1010). The process manufactures the plurality of parts (operation 1020), and joins the plurality of parts by the plurality of fasteners to form the pressure structure (operation 1030). The process terminates thereafter.

Figure 11:
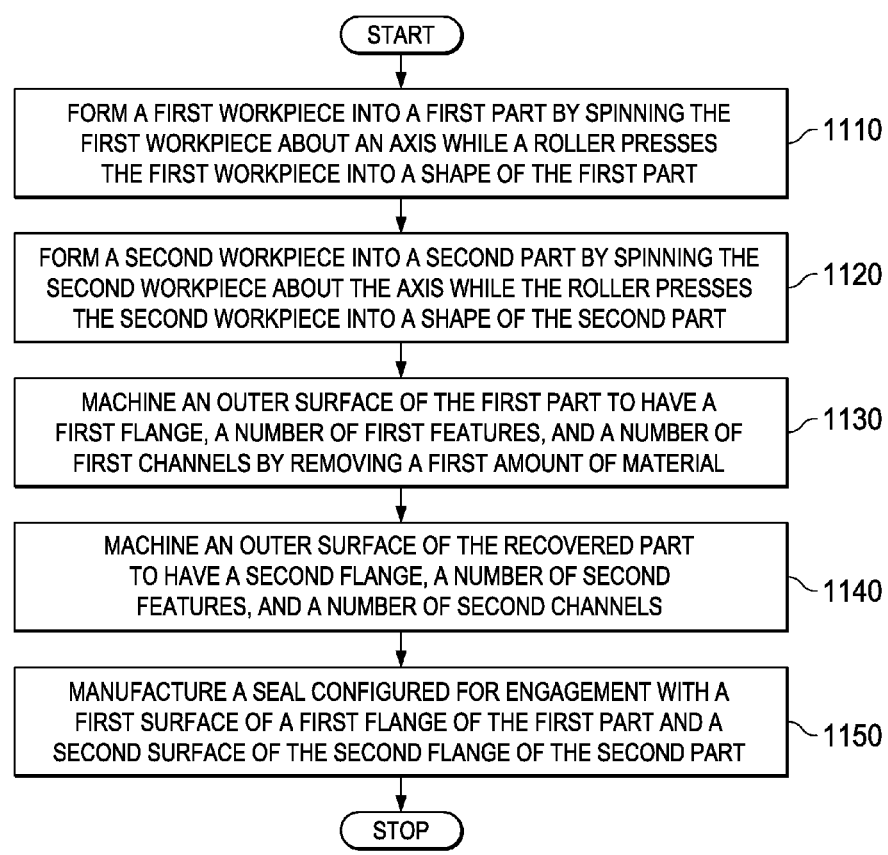
FIG. 11 is a flowchart of a method of manufacturing the interior structure depicted in accordance with an advantageous embodiment.

Turning to FIG. 11, a flowchart of a method of manufacturing the interior structure is depicted in accordance with an advantageous embodiment. The process starts and forms a first workpiece into a first shape by spinning the first workpiece about an axis while a roller presses the first workpiece into the first shape (operation 1110). The process forms a second workpiece into a second shape by spinning the second workpiece about the axis while the roller presses the second workpiece into the second shape (operation 1120).

The process machines the first shape to form the first flange on a first outside of the first shape and machines the second shape to form the second flange on a second outside of the second shape by removing a first amount of the material (operation 1130). The process machines the first shape to form a number of first features and a number of first channels on the first outside and machines the second shape to form a number of second features and a number of second channels on the second outside by removing a second amount of the material (operation 1140). The process terminates thereafter.

Figure 12:
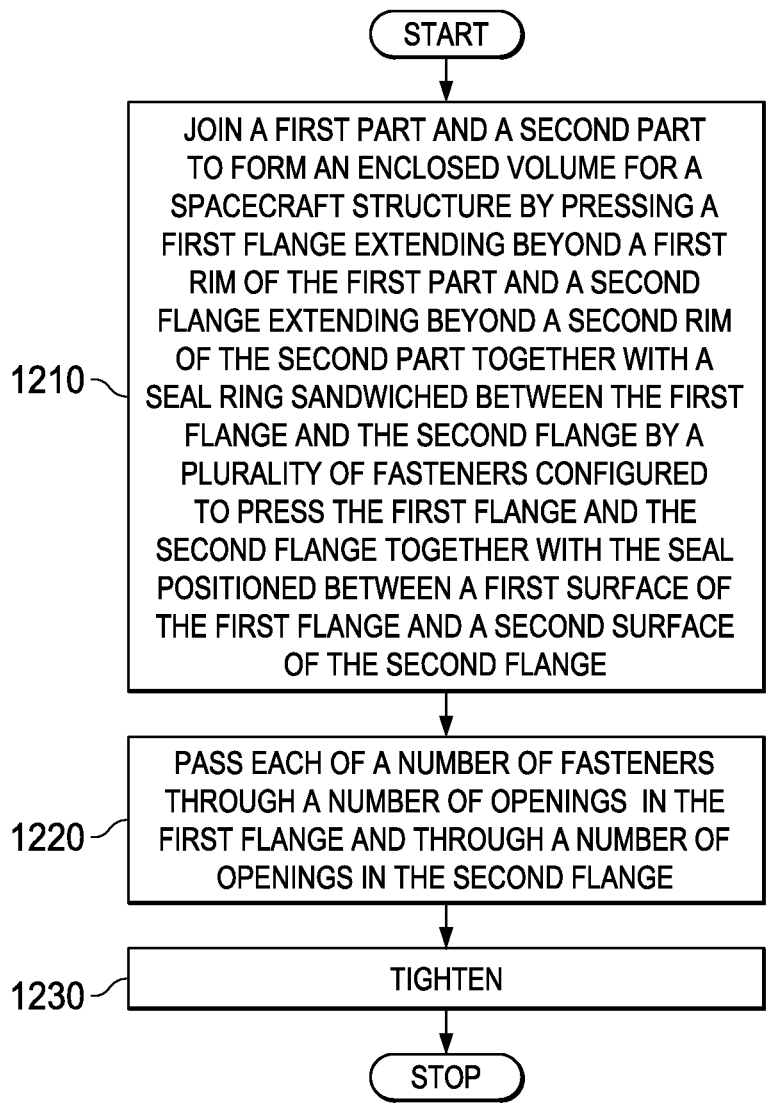
FIG. 12 is a flowchart of a method of assembling the pressure structure depicted in accordance with an advantageous embodiment.

Turning to FIG. 12, a flowchart of a method of assembling the pressure structure is depicted in accordance with an advantageous embodiment. The process starts and joins a first part and a second part to form an enclosed volume for a spacecraft structure by pressing a first flange extending beyond a first rim of the first part and a second flange extending beyond a second rim of the second part together with a seal ring sandwiched between the first flange and the second flange by a plurality of fasteners configured to press the first flange and the second flange together with the seal positioned between a first surface of the first flange and a second surface of the second flange (operation 1210).

The process passes each of a number of fasteners through a number of openings in the first flange and through a number of openings in the second flange (operation 1220). The process tightens the number of fasteners to form a seal between the first part and the second part configured for a pressurized volume in a pressure structure of a spacecraft (operation 1230). The process terminates thereafter.

The description of the different advantageous embodiments has been presented for purposes of illustration and description, and is not intended to be exhaustive or to limit the embodiments to the forms disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
   a first part, a second part, and a seal ring are fastened together to form a pressure structure configured for a spacecraft structure of a spacecraft, wherein the first part and the second part are each formed from a single workpiece;
   wherein the first part has a first shape and the second part has a second shape;
   wherein the first part is machined to form a first flange on a first part outside surface and the second part is machined to form a second flange on a second part outside surface by removing a first amount of a material from the first part and from the second part;
   wherein the first part outside surface is machined to form a number of first part features and the second part outside surface is machined to form a number of second part features by removing a second amount of the material from the first part and from the second part;
   wherein the number of first part features comprises a number of first part patterns and a number of first part channels;
   wherein the number of second part features comprises a number of second part patterns and a number of second part channels;
   wherein the number of first part patterns comprise a number of first part walls forming a number of first part triangular spaces and a number of first part channels, the number of first part walls intersecting a number of first part nodes;
   wherein the number of second part patterns comprise a number of second part walls forming a number of second part triangular spaces and a number of second part channels, the number of first part walls intersecting at a number of second part nodes;
   wherein at least a first node portion of the number of first nodes comprises a number of first blind holes configured to receive one of a number of threaded attachments;
   wherein at least a second node portion of the number of second nodes comprise a number of second blind holes configured to receive one of the number of threaded attachments;
   wherein a first part inner surface comprises a number of first part inner surface blind holes penetrating a number of first part closed nodes configured to received one of the number of threaded attachments;
   wherein a second part inner surface comprise a number of second part inner surface blind holes penetrating a number of second part closed nodes configured to receive one of the number of threaded attachments; and
   wherein the number of second part closed nodes and the number of second part closed nodes comprise each node that does not have a blind hole.

2. The apparatus of claim 1 further comprising:
   wherein the first flange extends from a first edge of the first part;
   wherein the second flange extends from a second edge of the second part;
   wherein the seal ring is configured for engagement between the first flange and the second flange, wherein the first flange extends beyond a first rim of the first part and the second flange extends beyond a second rim of the second part;

a number of grooves in a top surface and in a bottom surface of the seal ring configured to receive a number of sealing elements; and a plurality of fasteners configured to pass through a plurality of through holes in the seal ring and a plurality of openings in each of the first flange and the second flange;

wherein each of the plurality of fasteners are tightened to press the first flange and the second flange against the seal ring and the number of sealing elements to form the pressure structure of the spacecraft.

3. The apparatus of claim 1 further comprising:

a number of first members affixed in a number of first part channels; and a number of second members affixed in a number of second part channels;

wherein the number of first part members and the number of second part channels are configured to receive an outer layer of the spacecraft.

4. The apparatus of claim 1 further comprising:

wherein the first part inner surface and the second part inner surface are substantially smooth.

5. The apparatus of claim 1 further comprising:

a tunnel engaged to one of the first part and the second part.

6. The apparatus of claim 1 further comprising:

wherein the structure is selected from one of a crew module, a cargo module, and a space station module.

7. An apparatus comprising:

a first part, a second part, and a seal ring are fastened together to form a pressure structure configured for a spacecraft structure of a spacecraft, wherein the first part and the second part are each formed from a single block of material;

wherein the first part outside surface is machined to form a number of first part walls forming a number of first part triangular spaces and a number of first part channels by removing a first amount of material from the first part;

wherein the second part outside surface is machined to form a number of second part walls forming a number of second part triangular spaces and a number of second part channels by removing a second amount of material from the second part;

wherein the number of first part walls intersect a number of first part nodes;

wherein the number of second part walls intersect at a number of second part nodes;

wherein at least a first node portion of the number of first part nodes comprises a number of first blind holes configured to receive one of a number of threaded attachments; and wherein at least a second node portion of the number of second part nodes comprise a number of second blind holes configured to receive one of the number of threaded attachments.

8. The apparatus of claim 7 further comprising:

wherein a first part inner surface comprises a number of first part inner surface blind holes penetrating a number of first part closed nodes configured to received one of the number of threaded attachments;

wherein a second part inner surface comprise a number of second part inner surface blind holes penetrating a number of second part closed nodes configured to receive one of the number of threaded attachments; and wherein the number of second part closed nodes and the number of second part closed nodes comprise each node that does not have a blind hole.

* * * * *